US012723626B2

(12) United States Patent
Stautner et al.

(10) Patent No.: US 12,723,626 B2
(45) Date of Patent: Sep. 1, 2026

(54) SUSPENSION STRUT BEARING HAVING A CAP AND PRODUCTION METHOD

(71) Applicant: Schaeffler Technologies AG & Co. KG, Herzogenaurach (DE)

(72) Inventors: Ralf Stautner, Nuremberg (DE); Jürgen Hahn, Burhhaslach (DE); Gerhard Meyer, Lehrberg (DE); Jens Dungs, Nuremberg (DE); Rainer Lutz, Markt Erlbach (DE)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 0 days.

(21) Appl. No.: 18/687,342

(22) PCT Filed: Aug. 26, 2022

(86) PCT No.: PCT/DE2022/100639
§ 371 (c)(1),
(2) Date: Feb. 28, 2024

(87) PCT Pub. No.: WO2023/046227
PCT Pub. Date: Mar. 30, 2023

(65) Prior Publication Data

US 2024/0369106 A1 Nov. 7, 2024

(30) Foreign Application Priority Data

Sep. 27, 2021 (DE) ..................... 10 2021 124 865.5

(51) Int. Cl.
*F16C 19/10* (2006.01)
*B60G 15/06* (2006.01)
*F16C 35/04* (2006.01)

(52) U.S. Cl.
CPC .......... *F16C 35/042* (2013.01); *B60G 15/067* (2013.01); *F16C 19/10* (2013.01);
(Continued)

(58) Field of Classification Search
CPC .... F16C 19/10; F16C 35/042; F16C 2208/60; F16C 2220/04; F16C 2326/05; B60G 15/067; B60G 15/068
See application file for complete search history.

(56) References Cited

U.S. PATENT DOCUMENTS

2017/0136841 A1* 5/2017 Wollner .............. F16C 33/7886
2018/0335089 A1* 11/2018 Shaikh ................... G01B 21/16
2021/0172478 A1* 6/2021 Yan ....................... F16C 35/042

FOREIGN PATENT DOCUMENTS

DE 102007024628 A1 * 12/2007 ............ F16C 35/042
DE 102007024582 A1 * 11/2008 ............ F16C 33/467
(Continued)

OTHER PUBLICATIONS

Germany Patent and Trademark Office, Office Action dated May 23, 2022, for priority Germany Patent Application 10 2021 124 865.5.
(Continued)

*Primary Examiner* — Phillip A Johnson

(57) ABSTRACT

A suspension strut bearing for a motor vehicle includes a cap, a guide ring rotatably mounted relative to the cap about an axis of rotation, and a bearing arranged between the cap and the guide ring. The cap has a profile with a rib structure open in a radial direction on a front face directed towards a body of the motor vehicle. In some example embodiments, the profile of the open rib structure is formed from multiple webs. At least one first web may be formed at least partially in a circumferential direction on the cap, and at least one second web may be formed at least partially in the radial direction on the cap.

10 Claims, 2 Drawing Sheets

(52) U.S. Cl.
CPC ...... *F16C 2208/60* (2013.01); *F16C 2220/04* (2013.01); *F16C 2326/05* (2013.01)

(56) References Cited

FOREIGN PATENT DOCUMENTS

| | | | | | |
|---|---|---|---|---|---|
| DE | 102014206658 | A1 | | 10/2015 | |
| DE | 102017107058 | A1 | * | 10/2018 | ........... B60G 15/068 |
| DE | 102018122788 | A1 | | 3/2020 | |
| DE | 102020200586 | A1 | | 7/2021 | |
| FR | 2919909 | A1 | | 2/2009 | |
| WO | 2015014760 | A1 | | 2/2015 | |
| WO | WO-2019119320 | A1 | * | 6/2019 | .............. F16C 33/80 |
| WO | 2021018837 | A1 | | 2/2021 | |

OTHER PUBLICATIONS

Hintzen, H., et al., Konstruieren und Gestalten. 2. neubearbeitete Auflage. Braunschweig : Vieweg+Teubner Verlag, 1986 (Viewegs Fachbücher der Technik). S. 164, 255-257.-ISBN 978-9-322-85811-5.
Germany Patent and Trademark Office, Office Action dated Aug. 23, 2022, for priority Germany Patent Application 10 2021 124 865.5.
Written Opinion for corresponding to Korean Application No. 10-2024-7008767, dated Aug. 1, 2025.

* cited by examiner 6
6
6
2
8
7
7
5
8

2
7
6
5
7

2
7
6
7
5

2
7
6
7
5

SUSPENSION STRUT BEARING HAVING A CAP AND PRODUCTION METHOD

CROSS-REFERENCE TO RELATED APPLICATIONS

This application is the United States National Phase of PCT Appln. No. PCT/DE2022/100639 filed Aug. 26, 2022, which claims priority to German Application No. DE102021124865.5 filed Sep. 27, 2021, the entire disclosures of which are incorporated by reference herein.

TECHNICAL FIELD

The present disclosure relates to a suspension strut bearing for a motor vehicle with a cap, a guide ring and a bearing arranged between the cap and the guide ring. The disclosure also relates to a method for producing a suspension strut bearing.

BACKGROUND

Suspension strut bearings are part of the wheel suspension of independent suspension systems. The wheel suspension furthers the driving comfort as well as easy and precise steering of the wheels. In particular, the wheel suspension should keep road noise away from the body of the vehicle and be as light as possible. Depending on the design, the suspension strut bearing guides the shock absorber spring and forms a support surface for the shock absorber end stop. The suspension strut bearing absorbs the radial and axial forces transmitted via the shock absorber spring or shock absorber and ensures that the shock absorber spring can rotate during steering and compression with low friction and without tension in order to be able to operate without a restoring torque.

The suspension strut bearing is usually part of a so-called MacPherson strut. This strut consists of a spring, shock absorber and steering knuckle. The suspension strut bearing comprises a cap, which comes into contact with the body-side strut dome, and a guide ring, on which the shock absorber spring is supported and through which it is guided. The guide ring is rotatably mounted relative to the cap by means of a bearing. The bearing allows the spring to rotate relative to the body during steering, as the entire strut rotates during steering movements.

For example, DE 10 2014 206 658 B4 discloses a suspension strut bearing with a cap and with a guide ring rotatably mounted relative to the cap about an axis of rotation. An axial bearing is arranged between the cap and the guide ring. The cap comprises a soft component and a hard component, and the soft component has at least two circumferential sealing lips that contact the guide ring in a grinding manner in order to seal the axial bearing. A front face of the hard component that comes into contact with the strut bearing comprises a profile, wherein this profile has a closed rib structure.

Due to the closed rib structure, a plurality of cavities are formed on the cap. These cavities have a single opening due to the production process, namely the opening through which the tool is pulled out during production. In other words, when producing the rib structure, the tool enters into the cavities to be formed and forms the closed rib structure when it is pulled out axially. The tool comprises a plurality of delicate and in particular pin-like moldings, which are designed to form the closed rib structure. Cooling the tool is complex and time-consuming due to the delicate moldings, wherein the moldings are sensitive due to their delicate structures and can be easily damaged.

SUMMARY

The present disclosure provides a suspension strut bearing that can be produced quickly and inexpensively. For example, a method for producing the suspension strut bearing is improved.

A suspension strut bearing for a motor vehicle according to the present disclosure includes a cap and a guide ring rotatably mounted relative to the cap about an axis of rotation. A bearing is arranged between the cap and the guide ring, and the cap has a profile with a rib structure open in the radial direction on a front face directed towards the body of the motor vehicle.

A rib structure open in the radial direction is to be understood such that the rib structure has no pockets or cavities that have only one opening or no opening. In other words, the rib structure of the profile open in the radial direction can be produced not only by axial demolding of a production tool, but also by radial demolding of the production tool, since there is no wall on the rib structure in the radial direction.

The rib structure open in the radial direction, for example, makes it possible to optimize the design of the production tool. For example, the moldings of the production tool that form the rib structure can be designed to be more solid, and, for example, tool life and cycle times are improved due to the resulting improved cooling and shorter cooling times. Furthermore, less material is required to form the cap, as the rib structure open in the radial direction lacks the wall in the radial direction, which would limit the cavity in the radial direction. This, for example, also results in cost savings. A further advantage of the open rib structure compared to a closed rib structure is the possibility of splash water run-off. The fact that no cavities are formed that are only open on one side means that splash water cannot accumulate but can, instead, flow off directly in the radial direction, which protects the bearing from corrosion, for example. The bearing may be designed as a ball bearing or sliding bearing.

The profile of the open rib structure may be formed from multiple webs. At least one first web may be formed at least partially in the circumferential direction on the cap and at least one second web may be formed at least partially in the radial direction on the cap. A web is to be understood as a wall or rib that is made of the same material as the cap and is integrally connected to the cap. For example, multiple webs can be integrally connected to one another. The webs of the profile may extend in the axial direction from the front face of the cap directed towards the body of the motor vehicle. In other words, the webs of the profile may be formed as elevations on the front face of the cap directed towards the body of the motor vehicle. The webs of the rib structure are used to transfer the spring forces introduced into the suspension strut bearing to the strut bearing on the body.

According to an example embodiment, the first web is formed circumferentially on the cap in the circumferential direction, and multiple second webs are formed radially inwards from the circumferential first web. Consequently, the first web is formed as closed in the circumferential direction and therefore has no ends. Multiple second webs extend radially inwards, starting from the circumferential first web. The second webs may be formed as essentially evenly distributed on the first web. The circumferential first web and the second webs formed radially inwards are used to transfer the spring forces introduced into the suspension strut bearing to the strut bearing on the body.

According to a further embodiment, the first web is formed circumferentially on the cap in the circumferential direction, and multiple second webs are formed radially outwards from the circumferential first web. Thus, multiple second webs extend radially outwards, starting from the circumferential first web. The second webs may be formed as essentially evenly distributed on the first web. The circumferential first web and the second webs formed radially outwards are used to transfer the spring forces introduced into the suspension strut bearing to the strut bearing on the body.

According to a further embodiment, the first web is formed circumferentially on the cap in the circumferential direction, and multiple second webs are formed radially inwards and radially outwards from the circumferential first web. Thus, multiple second webs extend both radially inwards as well as radially outwards, starting from the circumferential first web. The second webs may be formed as essentially evenly distributed on the first web. The circumferential first web and the second webs formed radially inwards and outwards are used to transfer the spring forces introduced into the suspension strut bearing to the strut bearing on the body.

According to a further embodiment, the circumferential first web is formed on the cap in a meandering manner. For example, the circumferential first web is formed on the cap essentially evenly in a meandering manner. A single circumferential first web may be formed on the cap in a meandering manner. Consequently, the first web includes first sections which extend in the circumferential direction of the cap and second sections which extend in the radial direction, e.g., essentially transversely to the first sections formed in the circumferential direction.

At least the meandering circumferential first web may form an end-face contact surface for axial contact with the body of the motor vehicle. In other words, the end-face contact surface of the meandering circumferential first web serves solely as the contact surface of the cap on the body of the vehicle. Alternatively, the end-face contact surface of the meandering circumferential first web can serve as the contact surface of the cap on the body of the vehicle together with other end-face contact surfaces on the second webs. This makes it possible to achieve optimal contact between the suspension strut bearing and the strut bearing.

According to a further embodiment, the circumferential first web is formed on the cap in a circular manner. This circular formation of the circumferential web is to be understood as a round or elliptical formation of the web on the cap. A single circumferential first web may be formed on the cap in a round or elliptical manner. Consequently, the round or elliptical first web has an inner circumferential surface and an outer circumferential surface, and the second webs can extend radially inwards or radially outwards starting from the respective circumferential surface of the first web.

The cap may be formed at least partially or completely from a polyamide material. In other words, the cap can be formed either from a single component, namely from the polyamide material provided as the hard component, or from at least two components, for example from a soft component such as thermoplastic polyurethane and the polyamide material provided as the hard component. The polyamide material is suitable for absorbing forces due to its rigidity and the thermoplastic polyurethane is suitable for sealing due to its elasticity.

In a method for producing a suspension strut bearing according to the disclosure, the rib structure of the profile open in the radial direction is formed on the cap of the suspension strut bearing by axial and/or radial demolding of at least one tool. For example, the moldings of the tool can be designed to be more solid due to the open rib structure, which shortens the production time and saves material as well as costs.

BRIEF DESCRIPTION OF THE DRAWINGS

Further measures improving the present disclosure are shown in more detail below together with the description of exemplary embodiments with reference to the figures, wherein identical components or elements are provided with the same reference symbol. In the figures.

DETAILED DESCRIPTION

Figure 1:
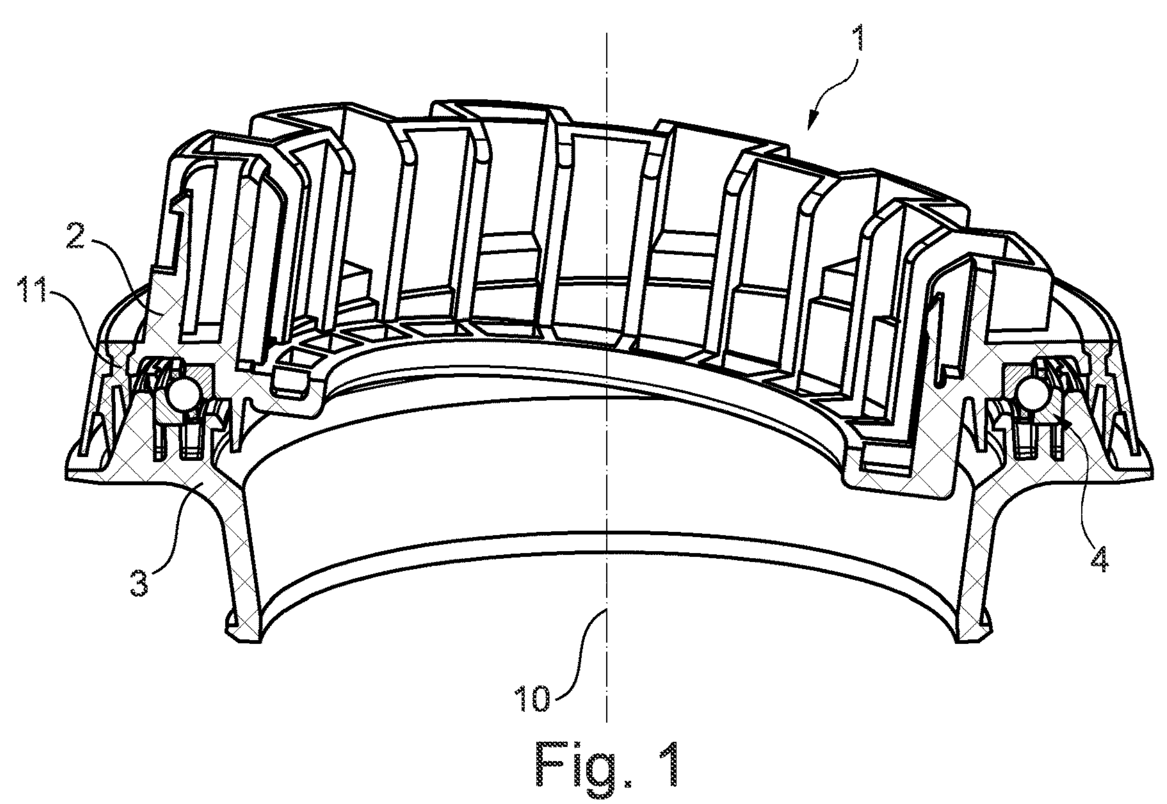
FIG. 1 shows a highly simplified sectional view of a suspension strut bearing according to the disclosure.

According to FIG. 1, a suspension strut bearing 1 according to the present disclosure for a motor vehicle—not shown further here—has a cap 2, a guide ring 3 and a bearing 4 arranged between the cap 2 and the guide ring 3. The guide ring 3 is rotatably mounted relative to the cap 2 about an axis of rotation 10 and can therefore rotate relative to the cap 2. The cap 2 is designed such that a front face thereof, which faces away from the guide ring 3, contacts the body of the vehicle in a positionally fixed manner. Furthermore, the cap 2 is formed from a polyamide material in order to support the spring forces introduced into the suspension strut bearing 1 at the suspension strut of the body. The bearing 4 is designed as an axial ball bearing and is sealed by means of a seal 11, wherein the seal 11 is formed on the cap 2 and circumferentially comes into contact with the guide ring 3. Alternatively, the bearing 4 can also be designed as a sliding bearing.

Figure 2:
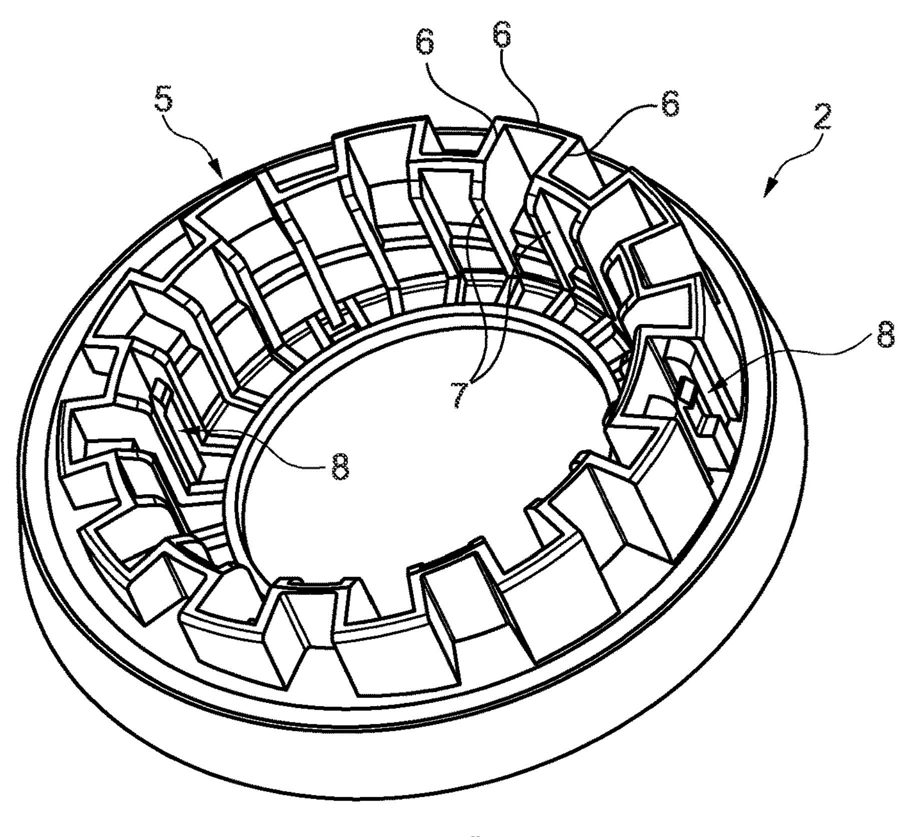
FIG. 2 shows a simplified perspective view of a cap of the suspension strut bearing according to a first exemplary embodiment.
Figures 3, 4, 5, 6:
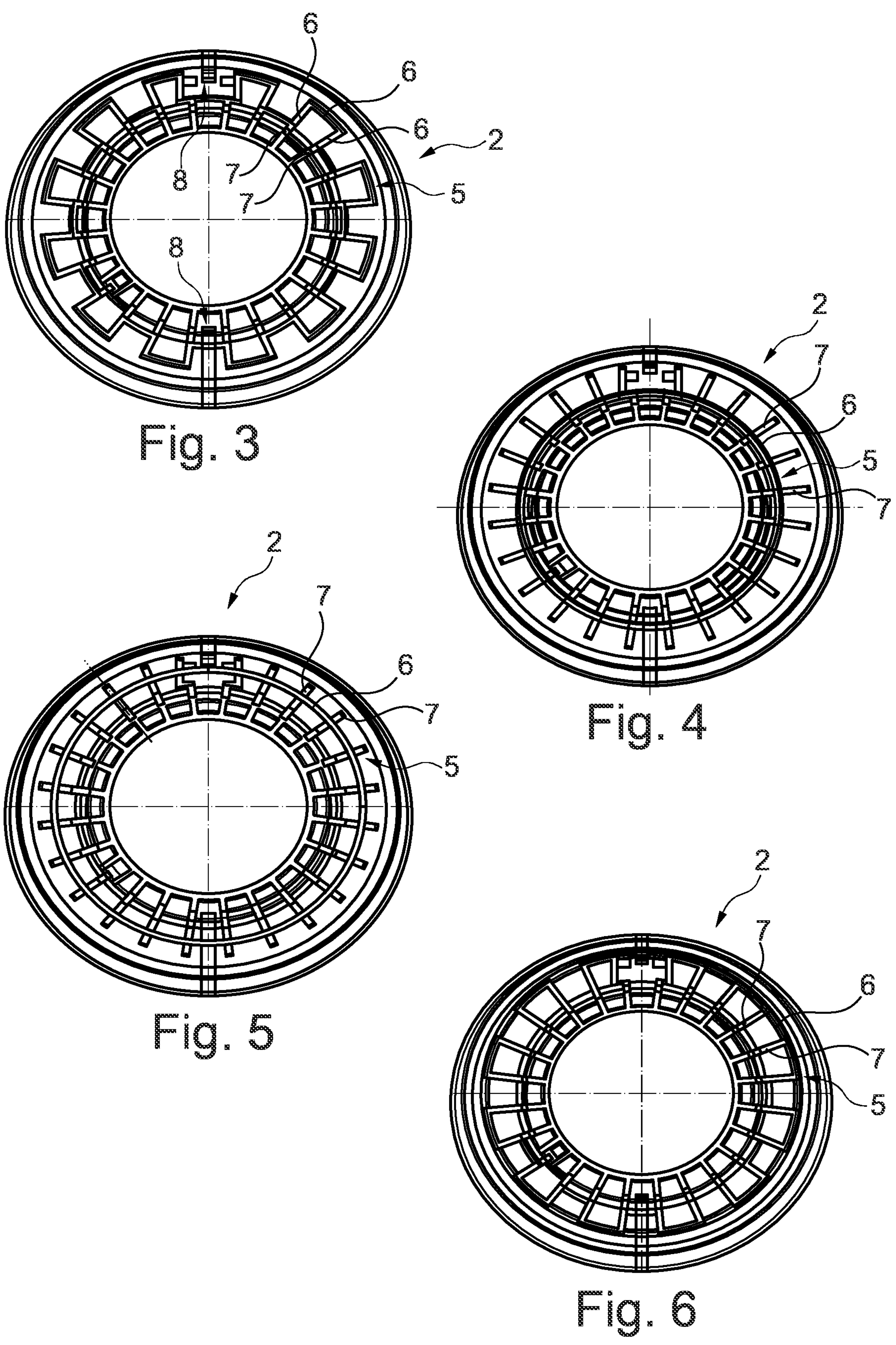
FIG. 3 shows a simplified top view of the cap of the suspension strut bearing according to FIG. 2.
FIG. 4 shows a simplified top view of the cap of the suspension strut bearing according to a second exemplary embodiment.
FIG. 5 shows a simplified top view of the cap of the suspension strut bearing according to a third exemplary embodiment.
FIG. 6 shows a simplified top view of the cap of the suspension strut bearing according to a fourth exemplary embodiment.

FIG. 2 shows a perspective view of the cap 2 from FIG. 1. FIG. 3 further shows a top view of the cap 2 from FIG. 1. According to FIG. 2 and FIG. 3, the cap 2 has a profile 5 with a rib structure open in the radial direction on a front face directed towards the body of the motor vehicle. The profile 5 of the open rib structure is formed from a first web 6 and multiple second webs 7. The webs 6, 7 of the profile 5 extend like elevations from the front face of the cap 2, which is directed towards the body of the motor vehicle, in the axial direction. Furthermore, multiple connecting clips 8 are formed in the axial direction on the front face of the cap 2 directed towards the body of the motor vehicle, and these connecting clips 8 are designed to connect the cap 2 to the strut bearing on the body and are arranged between the open rib structure. The first web 6 is formed circumferentially in a meandering manner on the front face of the cap 2 in the circumferential direction, and multiple second webs 7 are formed radially inwards from the circumferential first web 6. In the present case, the meandering circumferential first web 6 forms an end-face contact surface for axial contact with the body of the motor vehicle. The second webs 7 are essentially designed for radial contact with the body of the motor vehicle.

FIG. 4 shows a second embodiment of the cap 2 according to a top view. This second embodiment merely has a different profile 5 for the open rib structure compared to the first embodiment. The profile 5 of the open rib structure is formed from a first web 6 and multiple second webs 7. The first web 6 is formed circumferentially in a circular manner on the front face of the cap 2 in the circumferential direction, and multiple second webs 7 are formed radially outwards from the circular circumferential first web 6. In the present case, the circular circumferential first web 6 forms an end-face contact surface for axial contact with the body of the motor vehicle together with the second webs 7. The second webs 7 are further designed for radial contact with the body of the motor vehicle.

FIG. 5 shows a third embodiment of the cap 2 according to a top view. This third embodiment merely has a different profile 5 for the rib structure compared to the first embodiment. The profile 5 of the open rib structure is formed from a first web 6 and multiple second webs 7. The first web 6 is formed circumferentially in a circular manner on the front face of the cap 2 in the circumferential direction, and multiple second webs 7 are formed radially inwards and outwards from the circular circumferential first web 6. In the present case, the circular circumferential first web 6 forms an end-face contact surface for axial contact with the body of the motor vehicle together with the second webs 7. The second webs 7 are further designed for radial contact with the body of the motor vehicle.

FIG. 6 shows a fourth embodiment of the cap 2 according to a top view. This fourth embodiment merely has a different profile 5 for the open rib structure compared to the first embodiment. The profile 5 of the open rib structure is formed from a first web 6 and multiple second webs 7. The first web 6 is formed circumferentially in a circular manner on the front face of the cap 2 in the circumferential direction, and multiple second webs 7 are formed radially inwards from the circumferential first web 6. In the present case, the circular circumferential first web 6 forms an end-face contact surface for axial contact with the body of the motor vehicle together with the second webs 7. The second webs 7 are further also designed for radial contact with the body of the motor vehicle.

In all embodiments, the profile 5 of the rib structure open in the radial direction is designed in such a way that walls, which would delimit a cavity in the radial direction, are omitted. As a result, the profile 5 does not have any closed pockets or cavities around its circumference. This means that, in addition to the axial demolding of a production tool, a radial demolding of the production tool is also possible when producing the profile 5. This allows for an optimized design of the production tool, e.g., the moldings of the production tool that form the rib structure of the profile 5. These moldings can be designed to be more solid, and the cooling of the moldings can be designed to be more efficient in order to better dissipate waste heat during production. Furthermore, less material is required to form the cap, as the rib structure open in the radial direction lacks the wall in the radial direction. The open rib structure also allows splash water to flow off radially.

REFERENCE NUMERALS

1 Suspension strut bearing
2 Cap
3 Guide ring
4 Bearing
5 Profile
6 Web
7 Web
8 Connecting clip
10 Axis of rotation
11 Seal

The invention claimed is:

1. A suspension strut bearing for a motor vehicle, comprising a cap and a guide ring rotatably mounted relative to the cap about an axis of rotation, and a bearing arranged between the cap and the guide ring, wherein:

the cap has a profile with a rib structure open in a radial direction on a front face directed towards a body of the motor vehicle, the profile of the rib structure is formed from multiple webs, at least one first web is formed at least partially in a circumferential direction on the cap in a meandering manner, and at least one second web is formed at least partially in the radial direction on the cap.

2. The suspension strut bearing according to claim 1, wherein the multiple webs extend in an axial direction from the front face of the cap directed towards the body of the motor vehicle.

3. The suspension strut bearing according to claim 1, wherein the at least one second web is formed radially inwards from the at least one first web.

4. The suspension strut bearing according to claim 1, wherein the at least one second web is formed radially outwards from the at least one first web.

5. The suspension strut bearing according to claim 1, wherein the at least one first web forms an end-face contact surface for axial contact with the body of the motor vehicle.

6. The suspension strut bearing according to claim 1, wherein the at least one first web is formed on the cap in a circular manner.

7. The suspension strut bearing according to claim 1, wherein the cap is formed at least partially or completely from a polyamide material.

8. A method for producing a suspension strut bearing according to claim 1, wherein the rib structure of the profile open in the radial direction is formed on the cap of the suspension strut bearing by axial or radial demolding of a tool.

9. A suspension strut bearing for a motor vehicle, comprising:

a cap comprising:

a profile with a rib structure open in a radial direction on a front face directed towards a body of the motor vehicle, a plurality of connecting clips extending in an axial direction on the front face, the plurality of connecting clips arranged between ribs of the rib structure, a guide ring rotatably mounted relative to the cap about an axis of rotation, and a bearing arranged between the cap and the guide ring.

10. The suspension strut bearing according to claim 9, wherein the profile with the rib structure is formed from multiple webs, wherein at least one first web is formed at least partially in a circumferential direction on the cap, and wherein at least one second web is formed at least partially in the radial direction on the cap.

* * * * *